Figures 1, 2:
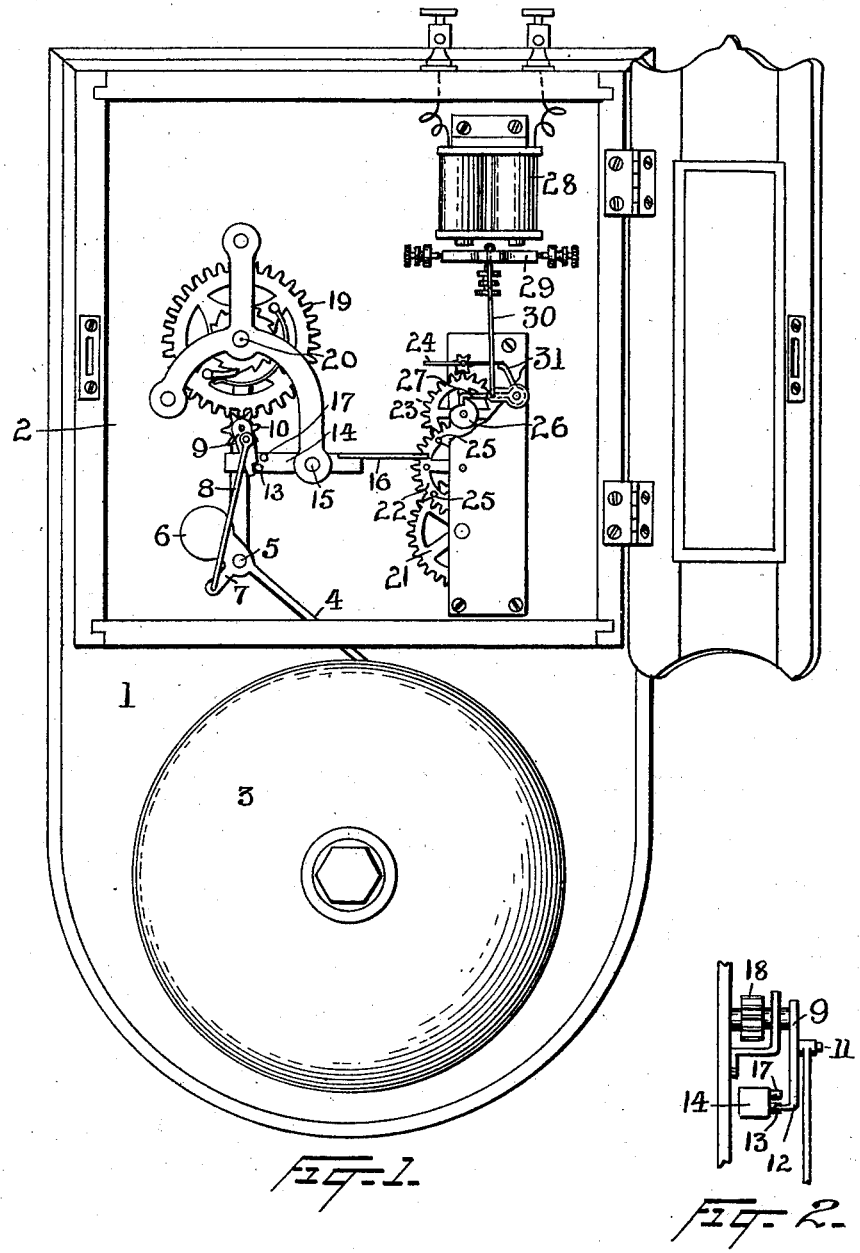

No. 666,189. Patented Jan. 15, 1901.
F. M. DUNN.
GONG TRIPPING MECHANISM.
(Application filed Jan. 31, 1900.)

(No Model.)

Witnesses
Norris A. Clark.
M. H. Watkins

Inventor
Frank M. Dunn,
By Stewart & Stewart
Attorneys

UNITED STATES PATENT OFFICE.

FRANK M. DUNN, OF BALTIMORE, MARYLAND.

GONG-TRIPPING MECHANISM.

SPECIFICATION forming part of Letters Patent No. 666,189, dated January 15, 1901.

Application filed January 31, 1900. Serial No. 3,455. (No model.)

*To all whom it may concern:*

Be it known that I, FRANK M. DUNN, a citizen of the United States of America, and a resident of Baltimore, Maryland, have invented certain new and useful Improvements in Gong-Tripping Mechanism, of which the following is a specification.

My invention relates to an electromechanical gong, and is an improvement on the device shown in Patent No. 504,827, granted to me September 12, 1893. In the apparatus shown in that patent the trip for the gong was directly connected to the train by which the trip was operated, and in cases where large loud-ringing gongs were employed it has been found that the work cast upon this trip is so great that sometimes the gong will not be tripped by the mechanism shown, and in any case the tripping mechanism must necessarily be made very large in order to insure its doing the work required, which involves cost, wear and tear, and uncertainty. I have devised an improvement upon this device which insures accurate and positive operation of the device with the employment of less power and a simpler mechanism than is shown in the first patent.

The principle of my improvement lies in the fact that I utilize the momentum of my tripping mechanism to operate the gong. The tripping mechanism is maintained out of engagement with the gong-trip and when tripped into action by the release of its own detent gets under full headway before it is required to do its work. The momentum thus accumulated is sufficient to effectually trip the gong, although the tripping mechanism is operated by a spring less powerful than the spring formerly employed.

In the drawings, Figure 1 is a vertical elevation of my gong, showing the tripping mechanism in front elevation, with a part of the retaining-plate broken away to show the operative parts. Fig. 2 is a side elevation of the gong-detent.

Referring to Fig. 1, 1 is a base on which is maintained a case 2, containing the gong-striking mechanism.

3 is a gong.

4 is a hammer-arm pivoted at 5, having a counterweight 6 at the opposite end and the arm 7 at right angles to the hammer-arm.

8 is a connecting-rod by which the hammer is operated.

9 is a crank fast upon the arbor 10. Crank 9 is shown in larger view in Fig. 2. It is provided on its free end, beyond the crank-pin 11, with a hook 12, which stands normally in the path of a detent-pin 13, by which it is held in check. The pin 13 is set in the side of a pivoted lever 14, pivoted at 15 and having a spring end 16, which stands in the path of the tripping mechanism. Upon the same lever 14 is a second pin 17, located above the pin 13 and nearer to the pivot of the lever 14.

18 is a pinion fast upon the arbor 10 and meshing with a gear 19 and driven by the spring upon the arbor 20. The pin 17 is so located upon the lever 14 that when the lever is moved by its tripping mechanism the pin 13 will be carried away from the hook 12 on the end of the crank 9, and the crank will be turned by the spring driving the train 19 and 18 until it makes contact with the pin 17, which will hold the crank stationary until the end 16 of the lever 14 is released by its tripping mechanism, when it will fall back of the position shown in Fig. 1, and in doing so the pin 17 will rise above and beyond the end of the hook 12, and the crank 9 will be free to make a revolution under the influence of its spring. As soon as it has made a revolution, however, the hook 12 will engage the pin 13 and stop the crank 9.

The tripping mechanism for the structure just described consists of a train of gears 21 22 23 and a vane 24. The train is spring-driven. On the face of 22 there are a series of eight pins 25 25. This number may be varied as occasion requires. These pins project from the side of the wheel and stand in the path of the spring end 16 of the lever 14 and raise it when they make contact with it.

26 is a detent-wheel having a notch in its periphery and located on the arbor of gear 23.

27 is a detent-hook engaging the notch of the detent-wheel 26 and holding it and the train stationary when in engagement with the notch.

28 is an electromagnet connected to a line and adapted to receive a current from an electromagnetic generator.

29 is an armature of the magnet connected by a rod 30 to the detent-hook 27.

31 is an arm secured to the arbor upon which the detent-hook 27 is secured and moving with the hook to stop the vane when the hook falls into engagement with the notch of the detent-wheel 26. The notch of the detent-wheel 26 is so located in relation to the pins upon the side of the wheel 22 that it will stop the train and hold it in such a position that a pin will not be in contact with the lever 16, but will be so far removed from it that the tripping-train will be able to acquire its maximum speed and momentum before the pin below the lever will strike it. When this condition exists, the momentum of the train will be sufficient to strike the lever and trip the detent of the striking mechanism and insure a safe and positive operation of the striking mechanism with the employment of the minimum of power.

Having thus described my invention, what I claim, and desire to secure by Letters Patent, is—

1. The combination with a gong and its hammer, of mechanism for operating the hammer, a detent for holding said mechanism in check, a device for tripping said detent, maintained normally out of engagement with said detent and means for imparting to said device an accelerating speed, whereby said tripping device when started can move freely and acquire its maximum momentum before coming in contact with the detent.

2. The combination with a gong and its hammer, of mechanism for operating the hammer automatically, a detent for holding said mechanism in check, a train of spring-actuated gears, one of which is provided with a series of pins so located as to travel into and out of engagement with the gong-detent as the gear revolves, and a detent for said train, arranged to hold said pins out of engagement with the gong-detent when the train is at rest, said train being adapted to move with an accelerating speed when released from the detent.

Signed by me at Baltimore city, State of Maryland, this 24th day of January, 1900.

FRANK M. DUNN.

Witnesses:
CHARLES H. MILLIKIN,
W. W. POWELL.